Aug. 30, 1966
H. H. MAGEE
3,269,224
OPHTHALMIC FRAME BRIDGE TOOL
Filed Dec. 30, 1964
2 Sheets-Sheet 1
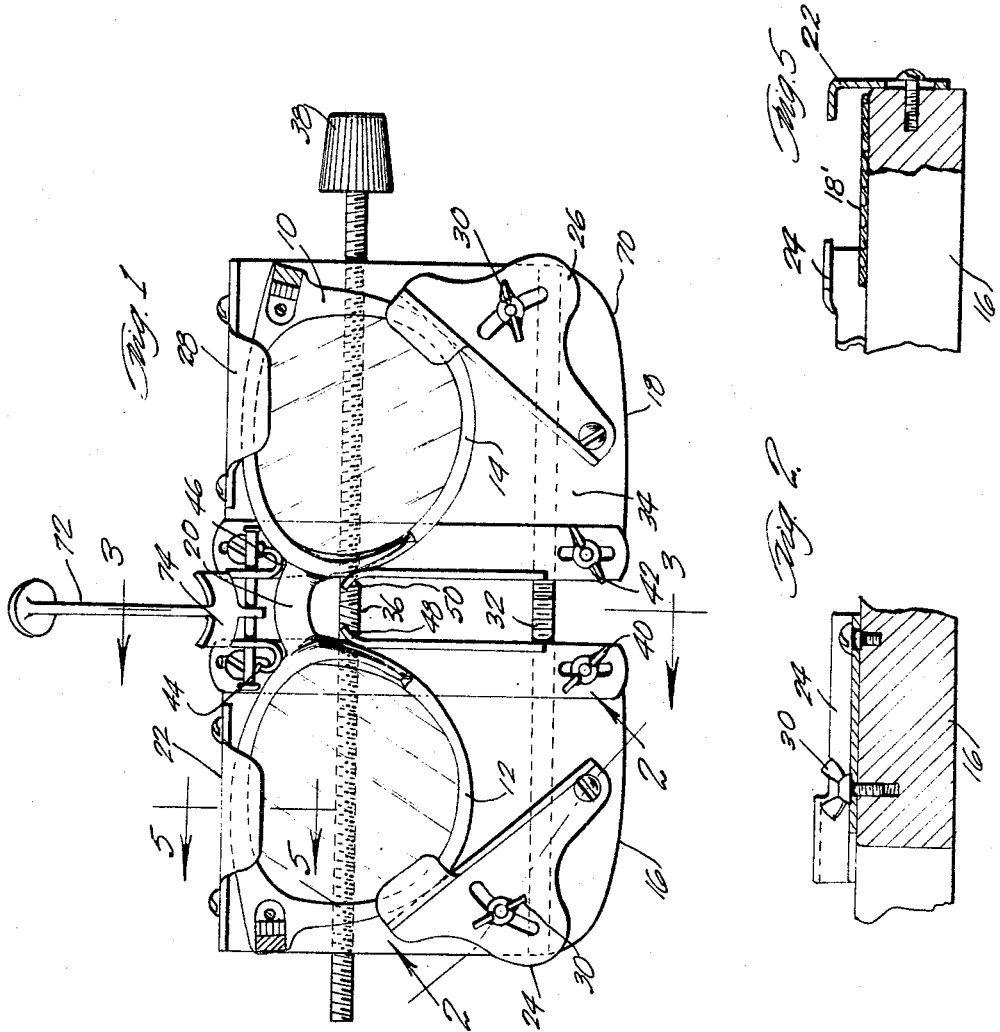
INVENTOR.
HAROLD H. MAGEE
BY
Victor J. Evans & Co.
Attorneys Aug. 30, 1966
H. H. MAGEE
3,269,224
OPHTHALMIC FRAME BRIDGE TOOL
Filed Dec. 30, 1964
2 Sheets-Sheet 2
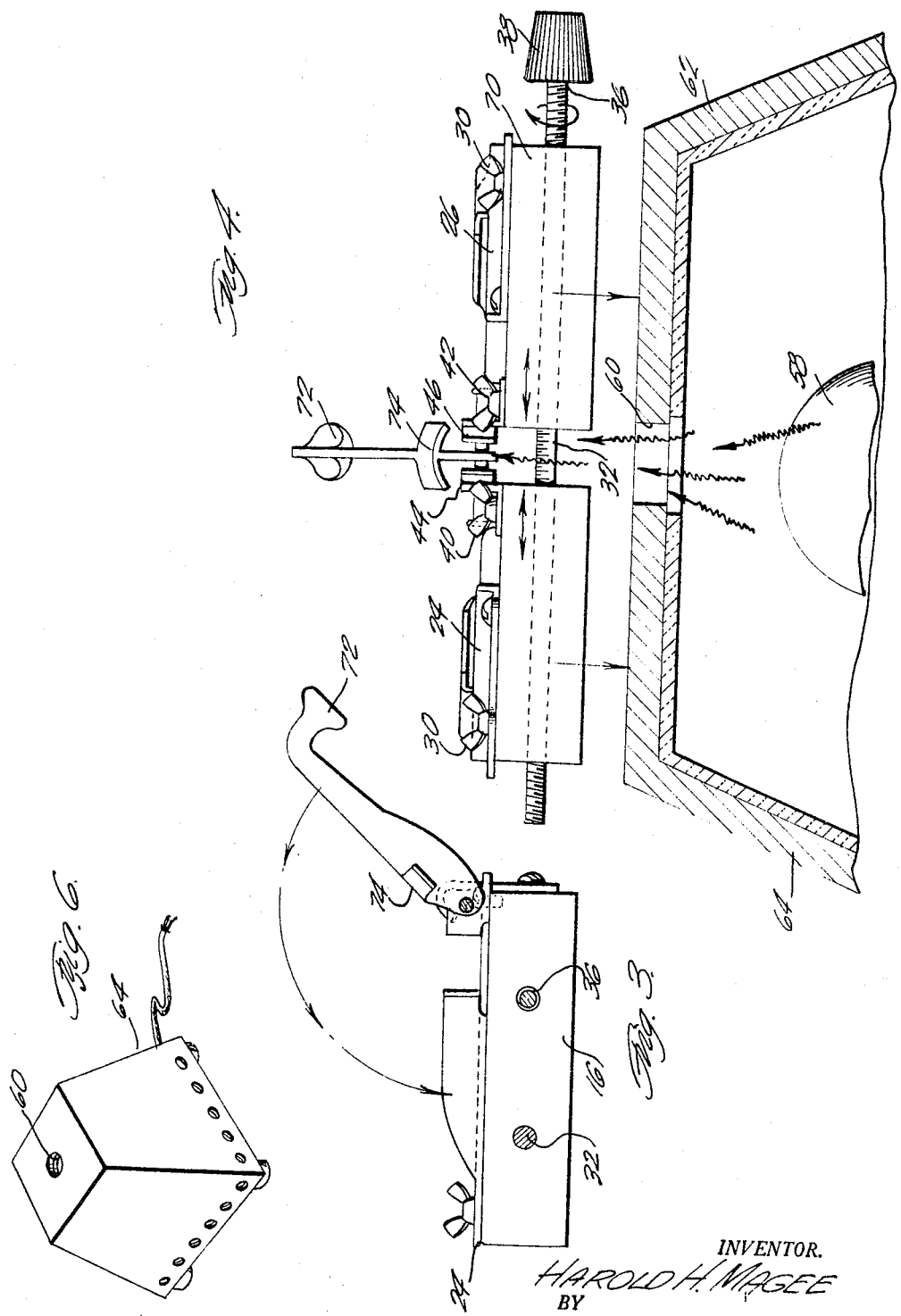
INVENTOR.
HAROLD H. MAGEE
BY
Victor J. Evans & Co.
Attorneys United States Patent Office 3,269,224
Patented August 30, 1966

3,269,224
OPHTHALMIC FRAME BRIDGE TOOL
Harold Hamilton Magee, 3192 Spottswood Ave.,
Memphis, Tenn.
Filed Dec. 30, 1964, Ser. No. 422,358
4 Claims. (Cl. 81—3.5)

The present invention relates to an improved ophthalmic frame bridge tool, and more particularly the invention relates to the provision of adjustable blocks or bases for receiving the lenses of a pair of spectacles, and means for holding the spectacles' frame in position while being subjected to the action of heat and the stresses to be exercised upon the bridge of the pair of spectacles by the tool of the invention.

The automatic adjustment of the jaws is found to accommodate themselves to a given spectacles' frame, and is a component portion of the invention in the frame bridge tool.

Therefore, the invention seeks to provide an improved frame bridge stretcher for ophthalmic frames, and one particular embodiment of the invention includes such structural details in the form of adjustable blocks or bases, adjustable jaws, and means for holding the frames of the pair of spectacles being worked upon in position and against distortion by using a cresting arm or tool element.

An object, therefore, of the invention is to provide an ophthalmic frame bridge stretcher designed to stretch a bridge of a pair of spectacles, particularly where they are constructed of plastic such as Zylonite frames, the stretching being done by and within controlled amounts from ½ millimeter to 4 millimeters while maintaining the original frame alignment of the lenses and keeping the lenses exactly along their predetermined and proper axes.

In using the device of the invention, the bridge is stretched uniformly so that the bridge shank is not pulled thin at any point. When the bridge has been stretched the required amount, the original outward crest of the bridge can be given, and where desired, the forward crest can be increased accordingly.

The use of the invention permits the ophthalmologist, optometrist or dispenser to secure an exact bridge fitting for the patient without weakening the bridge structure.

The device of the invention may be used with any of the conventional frame heating apparatus such as the salt pan, air vent system, or hot plates.

Where desired, a special heating unit is supplied which is very simple in construction, where the heat can be applied directly to the bridge structure. This supplemental device that may be used with the invention supplies the necessary heat from a 60–75 watt bulb, and is inexpensive to operate and maintain. This particular heat source can also be used for minor frame adjustments such as temple angling. At the present time, pliers are used for securing bridge stretching and are quite difficult to manipulate properly and the amount of stretching secured is not a definitely controlled amount as is provided by the present invention. When using pliers for adjusting frame re-alignment, the initial frame alignment is frequently lost and only an experienced ophthalmologist, optometrist or dispenser can secure the correct alignment.

Another object, therefore, of the present invention is to provide for the elimination of guesswork in adjusting and reorienting the bridge so that it is done in measured and controlled amounts throughout.

The above and other objects and advantages of the invention will become apparent upon full consideration of the following detailed description and accompanying drawings in which:

FIGURE 1 is a plan view showing the ophthalmic frame bridge tool for adjusting the bridge of a pair of spectacles in accordance with a preferred embodiment and what is considered the best mode of practicing the invention;

FIGURE 2 is a cross-sectional view taken along lines 2—2 of FIGURE 1;

FIGURE 3 is a cross-sectional view taken along lines 3—3 of FIGURE 1;

FIGURE 4 is a cross-sectional view of a heater element together with a side elevation or front view of the ophthalmic tool of the invention, showing how heat is applied directly to the bridge structure as the bridge itself is being stretched in accordance with the invention;

FIGURE 5 is a cross-sectional view taken along lines 5—5 of FIGURE 1; and

FIGURE 6 is an illustration showing a perspective view of a type of heating means such as is also shown in FIGURE 4.

Referring now to the drawings, there is shown a pair of spectacles 10 having the lenses 12, 14 positioned or located within a lens-receiving portion of a pair of blocks or bases 16, 18 and upon protective pads 18'. The pair of spectacles 10 is shown as having a conventional bridge element 20, and the peripheral or circumferential portions of the lenses are retained on the blocks or bases 16, 18 by a metal fence or means 22, 24, 26, 28, for holding the spectacles frame on the pair of bases. The holding means 24, 26 are particularly adapted for being pivotally mounted and may contain a wing nut 30, 30 for securing the holding means 24, 26 in a desired position after it has been fitted upon the lens 12 or 14.

The blocks or bases 16, 18 may be of either metal construction or of plastic material, and they are respectively oriented with respect to each other by means of a metal rod 32 in which one end thereof is secured to the associated and adjacent base, while the other is in slidable engagement therewith, such as is present along the slidable portion 34 thereof. Also between the blocks 16, 18 is a threaded rod or screw 36 which has one end thereof with a left-hand threaded portion, and the other end thereof having a right-hand threaded portion, and a knob 38 is provided at one end thereof. The threaded rod 36 engages a corresponding threaded portion within the threaded opening extending through for receiving the threaded rod, so that the threaded portion within the block is adapted to receive the threaded rod. The threaded rod is constructed to be located in substantial parallel alignment with the metal rod 32.

The knob 38 may have an arrow or other indicative means on the surface perpendicular to the drawings shown in FIGURES 1 and 4 so that the arrow or other indicia may indicate the number of turns being applied to stretch the bridge 20 by the use of the tool.

At the intermediate portion between the blocks, there is provided a set of wing nuts 40, 42, for securing a pair of jaws 44, 46 in physical contact and apply any necessary force to the bridge as it is interposed between the jaws 44, 46, and cooperating jaws 48, 50. Thus the bridge 20 is interposed between the jaws 44, 46, 48, 50, and after the lenses have been inserted into the holding means 22, 24, 26, 28, and are tightened in place by adjusting the wing nuts 30, then the operation of stretching or distorting the bridge 20 may be undertaken.

FIGURE 4 shows how a light bulb 58 may be applied to generate and translate heat through an aperture 60 of a cover 62 of a heat generating means 64, so that the heat is passed along upwardly and toward the bridge to be stretched or distorted when the tool 70 is placed above the hole 60. Thus as the heat rises, it tends to contact the bridge 20 which becomes pliable, and in this condition a crest tool or arm 72 is lowered so that its working surface 74 may be applied to the bridge in distorting it as desired. FIGURE 3 shows the manner in which it is lowered into place, and where lateral stretching is desired, the knob 38 is turned so that the blocks or bases 16, 18 are displaced transversely or to and away from each other along the rods 32, 36. In this way, the bridge is adapted to be stretched and distorted as desired, and a scale or measurement arrangement may be provided on the rod 32 indicating the amount of stretch or distortion that is being provided to the bridge 20.

Additional embodiments of the invention will occur to others and therefore it is intended that the scope of the invention be limited by the appended claims only and not by the embodiment described hereinabove. Accordingly, reference should be made to the following claims in determining the full scope of the invention.

What is claimed is:

1. An ophthalmic frame bridge tool comprising a pair of bases adapted to receive a pair of spectacles, each base having retaining means to secure the associated lens of the pair of spectacles to the base, a pair of parallel rods extending from one base to the other, and one rod having one end secured to one base and the other end slidably engaging the other base and the other rod having left and right-handed threaded portions, respectively, to engage corresponding left and right-handed threaded portions of the bases, a bridge holding means including jaws for engaging the bridge of the pair of spectacles and thus allowing the bridge to be stretched or distorted when the bases are moved toward or apart from each other.

2. The invention according to claim 1 wherein a protective pad is disposed beneath each of said lenses of said pair of spectacles for protecting the pair of spectacles while the bridge is being adjusted.

3. The invention according to claim 1 wherein said slidable rod exposes indicia to provide bridge measurements before and subsequent to adjustment.

4. The invention according to claim 1 wherein a cresting arm is provided to adjust the bridge as the cresting arm is applied thereto, said cresting arm being pivotally mounted at a connection between the said jaws.

References Cited by the Examiner
UNITED STATES PATENTS 1,444,124  2/1923  Jaffe et al. _____ 81—3.5
2,684,002  7/1954  Horvath _____ 81—3.5

WILLIAM FELDMAN, *Primary Examiner.*

O. M. SIMPSON, *Assistant Examiner.*